United States Patent [19]

Gomez Llona et al.

[11] 3,899,690

[45] Aug. 12, 1975

[54] CONTROL DEVICE DETECTING SIGNAL DEVIATIONS FROM THRESHOLD VALUES

[75] Inventors: José Luis Gomez Llona; Rodolfo Di Pietro Elizarán, both of Munguia (Vizcaya), Spain

[73] Assignee: Arteche Instrumentacion Y Sistemas Electronicos, S.A., Munguia (Vizcaya), Spain

[22] Filed: May 8, 1974

[21] Appl. No.: 467,910

[30] Foreign Application Priority Data

May 10, 1973 Spain ................................ 414.624

[52] U.S. Cl. ............................. 307/215; 307/247 A
[51] Int. Cl. .......................................... H03k 19/34
[58] Field of Search ................ 307/215, 218, 247 A

[56] References Cited
UNITED STATES PATENTS 3,575,608  4/1971  Barth ................................. 307/215
3,683,284  8/1972  Mueller ............................. 307/215

*Primary Examiner*—John Kominski
*Attorney, Agent, or Firm*—Flynn & Frishauf

[57] ABSTRACT

A control device including first and second operators connected in parallel to a signal to be controlled through respective potentiometers or voltage dividers which adjust the respective threshold values of the system. One operator transmits a first response when the input signal exceeds a value corresponding to an upper threshold and another response when the input signal falls below that threshold. The second operator provides corresponding responses relative to a lower threshold of the input signal. The responses of the first and second operators are fed to a third operator whose control is at all times a function of the outputs of the first and second operators, the output of the third operator being used for control.

13 Claims, 2 Drawing Figures

CONTROL DEVICE DETECTING SIGNAL DEVIATIONS FROM THRESHOLD VALUES

The present invention relates to electrical control devices, and more particularly to control devices detecting deviations of an electrical signal from preestablished levels and controlling an external apparatus as a function of the detected deviations.

For example, one use of such a device is in the control of liquid levels within a number of preestablished storage levels in a container or vessel, wherein the supply to the container or vessel must be interrupted when the liquid level exceeds an upper level and connected when the liquid level falls to a lower preestablished storage level. Another use is in controlling the supply of electrical power to a plant so that upon exceeding a specified upper amperage or input rating, one of the units in that plant is cut off, the thermostat if it is domestic, reconnecting the cut off unit when the amperage drops from one upper level to a lower set-point.

A relay operating at the time when signal amplitude reaches the control threshold or rated value has been previously used for this purpose. However, this arrangement suffers the drawback that once the threshold signal value has been reached the relay will operate uninterruptedly in one or the other direction when detecting equality or balance at one moment and difference at another, respectively, inasmuch as this occurs instantaneously even when in minimum degree. This "oscillating-type" of operational characteristic results in a high degree of wear and tear and early failure of the relay itself and the devices it is controlling.

To prevent this, low-sensitivity relays have been used which therefore only detect a considerable degree of difference in signal level, thus overcoming the drawbacks outlined above but presenting the drawback that there will exist a large degree of control error caused by these relays due to their low sensitivity.

Another prior art solution resides in including a timing device in the relay which retards (or delays) its operation for a pre-set period of time after having detected the maximum signal value plus or minus a given error. This method has the same drawbacks as the foregoing, also aggravated by the fact that during this delay period of time the signal value may fall under or rise above abnormal conditions to possibly dangerous levels.

The most appropriate prior art solution for these needs is provided by automatic devices, making possible the suitable combination of at least two of these relays independently or integrated into a single housing, whereby one of the relays detects the maximum permissible or rated value of the signal or upper threshold and to act in consequence. These multi-relay systems effectively fulfill their function but nevertheless suffer the drawback of their doubling-up of circuit components and their complicated connection, which is reflected in a disproportionately high cost. Moreover, due to the increased components, failure rate is increased.

The main object of the present invention is to overcome the above-described drawbacks of the prior art by providing a control system and method which uses logic circuits arranged to provide sensitive and effective performance, while also being simple in construction and low in cost.

SUMMARY OF THE INVENTION

This system of the present invention uses a pair of identical first and second logic operators, whose response is in terms of the amplitude or quantity of their inputs exceeding, falling below or otherwise deviating from a preestablished level. A third logic operator has two inputs and a single output, the inputs being connected respectively to the outputs of the pair of identical logic operators, and the output being a function of the input levels.

The first and second operators are preferably connected in parallel to the signal to be controlled through respective potentiometers or voltage dividers which adjust their respective input signal fraction or threshold levels so that one operator transmits a first response while the input signal value exceeds the value associated with an upper threshold, and another response when the amplitude of the signal in question is below that threshold, while the second operator changes response by reason of its potentiometer or voltage divider setting when the input signal amplitude coincides with a lower threshold, both thresholds and their difference being adjustable to endow the system with application versatility which is especially important in the industrial control field. The responses of the first and second operators establish the input signals for the third operator, whose control response is at all times a function of the outputs of the first and second operators, and consequently a function of the signal value to be controlled in respect of the thresholds.

DETAILED DESCRIPTION OF ILLUSTRATED EMBODIMENT

Figure 1:
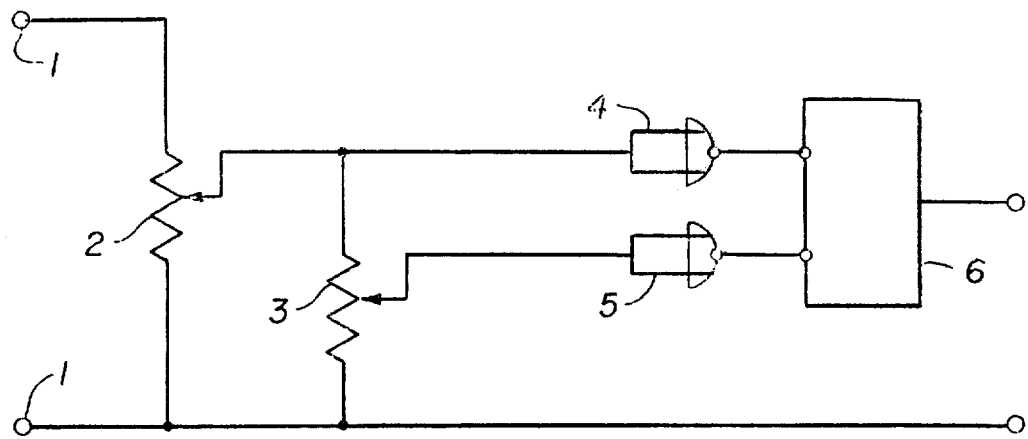
FIG. 1 is a schematic block diagram of an embodiment of the present invention.

Referring to FIG. 1, a system according to the present invention includes two logic operators 4,5 (or digital logic circuits), each being capable by their own structure of transmitting two differing response signals, which can be expressed by digital signal levels 1 and 0, and of transmitting one or the other signal as a function of the amplitude of its input signal exceeding or otherwise deviating from an established level-limit or threshold value.

The two operators 4,5, which may take the form of NOR gates as illustrated, are connected mutually in parallel and their respective inputs are respectively connected to the terminals 1 supplying the controllable signal through two potentiometers 2,3 which are used for setting up the incoming signal fraction for control in the operators 4,5 and establishing the ratios between the amplitude of the controlled signal and the amplitude of the incoming signal in each of the operations. The potentiometers 2,3 define the two values for the controlled signal matching the level-limit of the respective operators 4,5.

Change of the output level of operator 4 from the level 1 to the level 0 occurs when the input signal amplitude thereto goes beyond the level-limit defined by the setting of potentiometer 2 and therefore when the amplitude of the controlled signal exceeds an upper threshold. The other operator 5 makes this change in output level from 1 to 0 when the amplitude in question (defined by the setting of potentiometer 3) goes beyond a level-limit which is now matched in the input to a lower threshold. Both thresholds are adjustable by means of the regulation capability of the potentiometer 2,3. Potentiometer 2 enables adjustment of the two thresholds while potentiometer 3 adjusts the lower and consequently only the percentage return. The potentiometers may be continuously variable or stepped, or may be replaced by equivalent voltage dividers.

The output of the two operators 4,5 are connected to the input of a logic actuation operator 6 whose electrical output response 0, 1, establishes the control signal. Operator 6 (illustrated in detail in FIG. 2) transmits one of its responses, 1, when two input signals thereto of a single and specific class, 0, coincide, and transmits the other response 0 when the coincidental input signals are both 1. However, operator 6 does not cease transmitting a response until the next confluence at its input of two input signals of the same class, but differing from those which had previously coincided, thereby bringing about generation of the control signal in accordance with the invention.

Figure 2:
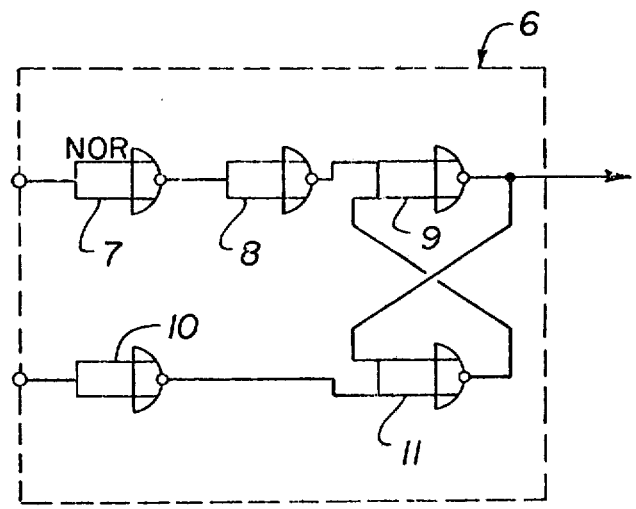
FIG. 2 is a schematic diagram of the operator 6 of FIG. 1.

Referring to FIG. 2, operator 6 includes NOR gates 7–11 interconnected as shown in FIG. 2 so as to provide the type of control output described hereinabove. While NOR gates are shown in FIG. 2, other equivalently performing logic elements could be used.

The Table set out below illustrates with sufficient clarity the control function performed by the system of the present invention on a signal which is to be controlled so that its quantity or amplitude is framed or controlled between two thresholds.

| SIGNAL VALUE | OPERATOR RESPONSE 4 | OPERATOR RESPONSE 5 | OPERATOR RESPONSE 6 |
| --- | --- | --- | --- |
| Below the lower threshold | 1 | 1 | 0 |
| After reaching lower threshold | 1 | 0 | 0 |
| When rising without reaching upper threshold | 1 | 0 | 0 |
| When going beyond upper threshold | 0 | 0 | 1 |
| When falling from upper threshold without reaching lower | 0 | 1 | 1 |
| When reaching lower threshold | 1 | 1 | 0 |

As seen from the above Table, the response or control signal from operator 6 is consequently at the digital 1 level and it so operates when the value of the controlled input signal at terminals 1—1 goes beyond the upper preestablished threshold and continues generating the 1 level control signal until the value of the controlled input signal at terminals 1—1 drops to the lower threshold. The operator 6 produces the 0 level response when the value of the controlled input signal drops below the lower threshold, continuing generation of this 0 signal level while the value of the controlled input signal rises until reaching the upper threshold, changing its response again to the 1 level when this takes place.

While the invention has been described above with respect to specific apparatus, it should be clear that various modifications and alterations could be made within the inventive concept. For example, the NOR gates may be replaced with other logic elements, such as various gates and/or flip flops, the combinations of which perform in a manner relative to the signal to be controlled as discussed above. The potentiometers may be replaced with other equivalently operating signal level varying control devices.

We claim:

1. An electrical signal detection system for generating a control signal in response to variations of an input signal, comprising:

first means (2) coupled to said input signal and providing a first signal which is a fraction of said input signal;

second means (3) coupled to the output of said first means (2) and providing a second signal which is a fraction of said first signal of said first means (2);

a first logic device (4) coupled to the output of said first means (2);

a second logic device (5) coupled to the output of said second means (3); and a third logic device (6) having at least two inputs, two inputs of which are respectively coupled to the outputs of said first and second logic devices (4,5) for generating (i) a first output signal when the two input signals coupled thereto coincide in time and are at identical first logic levels, and holding or maintaining said first output signal until the inputs thereto coincide in time and are of a second logic level, and (ii) generating a second output signal, distinctive from said first output signal, when said two input signals coincide in time and are of said second logic level.

2. Apparatus according to claim 1 wherein said third logic device (6) has two inputs.

3. Apparatus according to claim 2 wherein said first means defines an upper threshold value of said input signal, and said second means define a lower threshold value of the input signal.

4. Apparatus according to claim 3 wherein the outputs of said first and second logic devices (4,5) are the same and at a first logic level when said input signal is below said lower threshold, and are the same and at a second logic level when said input signal is above said upper threshold, said outputs of said first and second logic devices (4,5) being different from each other when said input signal is between said upper and lower thresholds.

5. Apparatus according to claim 4 wherein said third logic device (6) generates said first output signal when both of the inputs thereto indicate that said input signal is below the lower threshold value, continues to generate said first output signal even when one of the inputs thereto changes, generates said second output signal when both input signals thereto indicate that said input signal is above the upper threshold value, continues to generate said second output signal even when one of the input signals thereto changes to indicate that said input signal has fallen below the upper threshold value but has not reached the lower threshold value, and again generates said first output signal when said input signal falls below said lower threshold value.

6. Apparatus according to claim 1 wherein said first and second means (2,3) comprise first and second potentiometers, respectively, for enabling variable settings of said fractions of said signals.

7. Apparatus according to claim 1 wherein said first and second means (2,3) are first and second voltage divider means, respectively.

8. Apparatus according to claim 1 wherein said first and second logic devices are respective NOR gates.

9. Apparatus according to claim 1 wherein said third logic device (6) comprises a first NOR gate (9) and a second NOR gate (11), the output of said first gate being coupled to one of the inputs of the second gate, and the output of the second gate being coupled to one of the inputs of the first gate, the outputs of said first and second logic devices being respectively coupled to other inputs of said first and second gates, the output of said third logic device coupled to the output of at least one of said first and second gates.

10. Apparatus according to claim 9 wherein said first and second logic devices (4,5) each respectively comprise at least one NOR gate.

11. Apparatus according to claim 10 wherein said third logic device further comprises third and fourth NOR gates (7,8) series connected between the output of said first logic device (4) and an input of said first NOR gate (9), and a fifth NOR gate (10) coupled between the output of said second logic device (5) and an input of said second NOR gate (11).

12. Apparatus according to claim 3 wherein said first means (2) determine an input signal fraction to set a first threshold value, and said second means (3) determine a fraction of the output of said first means to set a second threshold value which differs in value from said first threshold value by an amount corresponding to the setting of said second means.

13. Apparatus according to claim 12 wherein said first means simultaneously determines the levels of the first and second thresholds, the second means setting the differential between the first and second thresholds.

* * * * *